Feb. 7, 1967

J. G. BURCH 3,302,581

GAS WELL TREATMENT METHODS

Original Filed July 27, 1965

J. G. BURCH
INVENTOR.

BY Ely Silverman
ATTORNEY

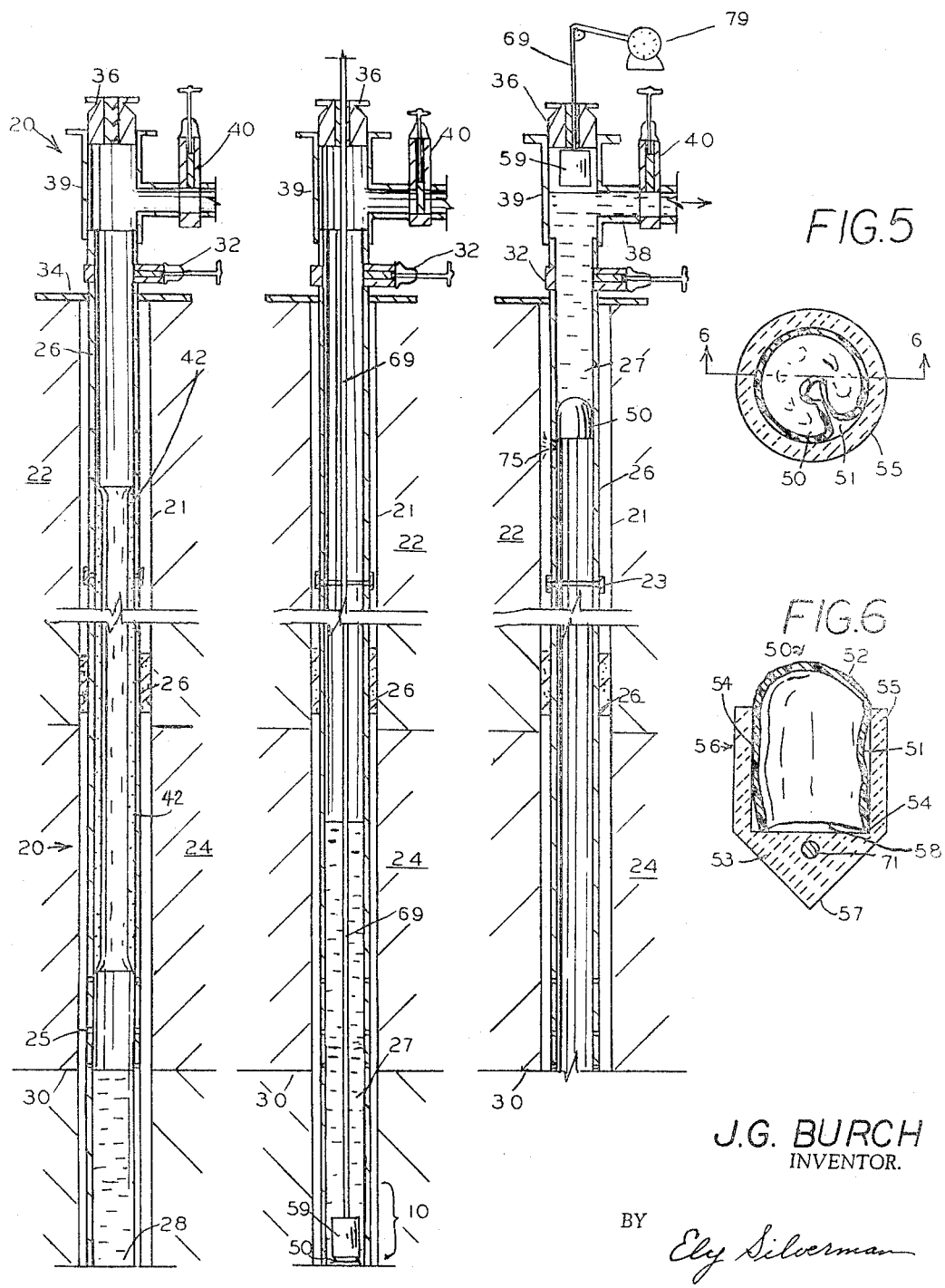

J.G. BURCH
INVENTOR.

BY Ely Silverman

ATTORNEY

Feb. 7, 1967   J. G. BURCH   3,302,581
GAS WELL TREATMENT METHODS
Original Filed July 27, 1965   4 Sheets-Sheet 4

J.G. BURCH
INVENTOR.

BY Ely Silverman
ATTORNEY

United States Patent Office 3,302,581
Patented Feb. 7, 1967

3,302,581
GAS WELL TREATMENT METHODS
Julius Gordon Burch, Hutchinson County, Tex.
(822 S. McGee, Borger, Tex. 79007)
Original application July 27, 1965, Ser. No. 475,125.
Divided and this application Apr. 27, 1966, Ser. No. 545,685
6 Claims. (Cl. 103—52)

This application is a division of my co-pending application Serial No. 475,125 entitled, "Gas Well Treatment Methods and Apparatuses Therefor," filed July 27, 1965.

This invention relates to methods for improved gas well production. More particularly this invention is directed to removal of water from bores of wells producing gas.

Gas wells are usually "produced" with varying quantities of water, i.e., gas wells usually, on discharge of gas from their surface outlet also condense from the gas from the formation varying quantities of water. This water usually is not altogether discharged from the surface outlet of the gas well but remains in the well. Water in gas wells is very undesirable as it substantially retards the flow of gas into the well bore. If such water is not regularly removed from the well, it accumulates a decline in production and stoppage results. There are at present several methods of attempting to remove water from gas wells. When gas flow is ample, water accumulation is minimized by opening the well to its full capacity and flowing the water out with the discharged gas. When a well discharge volume and pressure is medium, soap is put into the well and allowed to mix with the well water, thereby lowering the surface tension and causing it to foam. When the gas is flowed through the well, some water is carried upwards by the foam. When well pressure is low, water is periodically removed by pumping or bailing. However, these methods are expensive and inefficient. Further, the time it takes to pull water from the gas well by such previous methods is uncertain, slow, wasteful, and now even prohibited by various conservation regulations that prohibit blowing of wells in order to prohibit damage to crops by spraying salt water and to limit the waste of gas.

It has been discovered, according to this invention, that the thorough removal of water by the process of this invention from gas wells provides substantial increases in gas production therefrom. The operations of this invention remove liquids, such as brines, from gas wells quickly and efficiently.

It is, accordingly, one object of this invention to provide improved methods for treating gas wells to remove water therefrom.

Yet another object of this invention is to provide a method to rapidly and easily locate leaks in an oil well.

Other objects of this invention will be clear to those skilled in the art from the study of the below disclosure of specifications and drawings, which drawings form a part of the specification and in which drawings like reference numerals refer to like parts throughout all the drawings and wherein:

FIGURE 1 is a diagrammatic representation, mainly in longitudinal section, of a well and structures therein illustrating one apparatus of this invention and one step in the operation thereof;

FIGURES 2, 3, and 4 are diagrammatic representations as in FIGURE 1 showing successively subsequent stages in the operation of the apparatus in FIGURE 1;

FIGURE 5 is a diagrammatic cross sectional view through the zone 5—5 of FIGURE 1 in somewhat enlarged scale;

FIGURE 6 is a longitudinal section through section 6—6 of FIGURE 5;

FIGURE 7 is a diagrammatic representation, mainly in longitudinal sectional view, of a well as in FIGURE 1, that well being shown in a stage preliminary to the operation of the apparatuses shown in FIGURES 1–6 and 8–15;

FIGURE 8 is a diagrammatic representation, mainly in longitudinal section, of a well as in FIGURE 1 and an apparatus according to another embodiment of this invention in an early stage of its operation;

FIGURE 9 is a diagrammatic representation of the apparatus shown in FIGURE 8 in a subsequent step of operation thereof;

Figure 1:
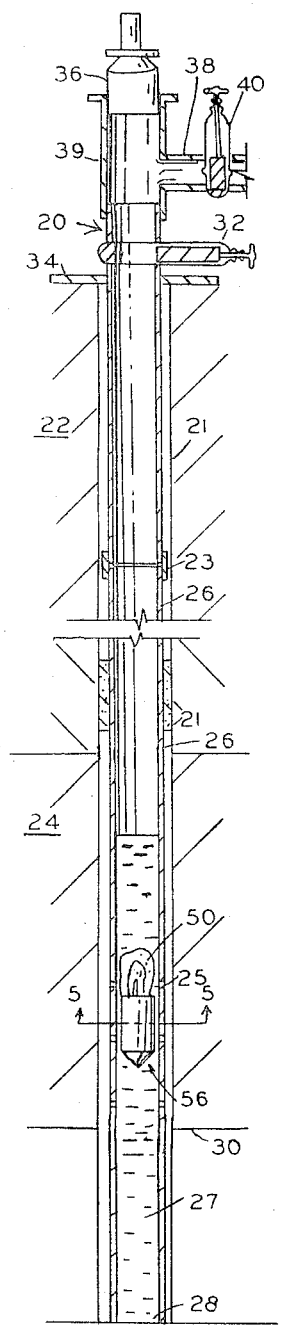
Figure 2:
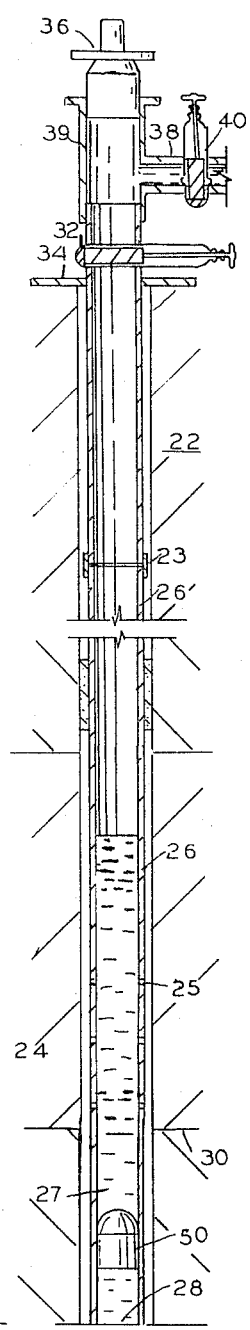

Broadly, according to this invention, a collapsible plug is injected into a gas well, which well has a water column. After injection into that column, the plug separates from a container and expands to fill the casing. The well gas pressure operates against that plug to lift the column of water to the surface and discharge it. In another embodiment, a plug is placed in the well by running a holder for that plug to a desired position in the well whereat the plug is discharged, expands and lifted by well gas. As an exemplary embodiment of this invention, a well 20 is treated by the process and apparatus of this invention. The well 20 passes through the surface formation 22 to a gas producing formation 24. The well hole or bore 21 has a tubing or casing string 26 on its interior. The bottom 28 of the well bore or hole 21 is located below the bottom 30 of the formation 24. The casing or tubing string 26 is set through the gas formation and has perforations as 25 at the level of the formation and has no holes below the gas formation. A conventional gate valve 32 is operatively attached in gas-tight manner to the top of the string 26 above the surface of the ground, 34. A surface T pipe 39 is attached in a gas-tight manner to the top of the gate valve; a removable seal 36 such as a lubricator or wire line holder is located above the surface pipe 39. A discharge line 38 with a discharge valve 40 is attached to the surface T pipe 39.

When gas valves 32 and 40 are open, due to expansion of the gas and cooling of tubing 26, water condenses along tubing 26 from the gas which flows from formation 24. This water accumulates in the tubing although it is penetrated by the upwardly passing gas which presses watery fluid upward and outward along the interior wall of the tubing 26. This action is somewhat similar to when rain upon a moving car's windshield is blown upward and kept upward by the wind thereagainst. The gas from the formtaion, in passing upwards of the bore of tube 26 thereby produces an annular liquid column or layer 42 to ¼ to 1″ thick of well water on the inside of the tubing string 26. This column or layer 42 provides and communicates hydraulically with water within the formation 24. As such column 42 usually has a substantial height (100–2,000 feet) it prevents such liquid from leaving the formation and such liquid thus is hydraulically forced into the formation blocks interstices in the formation through which gas might otherwise pass. Previous blowing methods above-mentioned do not remove any substantial proportion of layer 42; even bailing does not provide complete removal thereof because, on closing down the well the water in the annular column 42 falls and much of that water enters into the formation prior to removal by conventional methods only to reappear again when the valves 32 and 40 are open. This invention does remove such water substantially completely from the well.

According to one aspect of this invention, an expansible hollow U-shaped rubber plug 50, generally hemispherical and imperforate at its top 52 and cylindrical and imperforate at its sides 54 and open at its bottom 55 is folded within a container 56 soluble in the well liquid 27. The plug is made of an expansible rubber insoluble in the well liquid 27 and not forming a gum therewith; it folds to fit within the container 56. The top 52 is preferably reinforced with tire cord and the rubber of portions 52 and 54 is vulcanized natural rubber. Container 56 comprises an upper hollow annular cylindrical shell portion 55 joined firmly to the circular base of a lower conical portion 53. Conical portion 53 is a right circular cone and has the same outside diameter as the portion 55 and is co-axial therewith. Portion 55 surrounds a cylindrical cavity 51 open at its top 58. Portion 55 is made of pure salt (NaCl) of the rock salt variety (i.e. halite) usually No. 1 size ($<\frac{1}{4}''$, $>\frac{5}{32}''$). Portion 53 is formed of 90% salt (halite No. 1 size) and 10% soap (such as olive oil soap) or preferably detergent which melts at less than 212° F. and at more than 170° F., e.g. Igepon T,

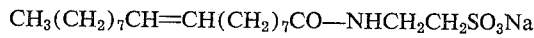

$$CH_3(CH_2)_7CH{=}CH(CH_2)_7CO{-}NHCH_2CH_2SO_3Na$$

In a preferred embodiment a ½ inch diameter sphere 71, of calcium carbide, or other material which reacts with water is provided to the center of the conical portion 53 to add additional gas to the interior of plug thereabove after the plug meets water and portion 53 dissolves therein, whereupon item 71 reacts with water to produce a gas. The container 56 is pointed at its bottom 57 and has an external diameter which is substantially smaller than the internal diameter of the casing or tubing 26 through which the container 56 is intended to pass, whereby the container 56 may readily fall through the well. The entire apparatus 50 as well as 56 are kept wrapped in cellophane, preferably separately. This prevents their deterioration. The apparatus may be thus kept for a shelf life of an indeterminate long time, in excess of six months. The dimensions of the embodiment of container 56 and plug 50 shown in FIGURE 5 for use in different size tubing are as follows:

|  | I (in.) | II (in.) |
| --- | --- | --- |
| Container 56: |  |  |
| Outside diameter | 4 | 5 |
| Chamber 55: |  |  |
| Inside diameter | 3 | 4 |
| Length | 4 | 4 |
| Cone, height | 2 | 2½ |
| Container weight | 1 lb. 3½ oz. | 1 lb. 14 oz. |
| Tubing 26, internal diameter | 5 | 6 |
| Plug 50: |  |  |
| Outside diameter | 5 | 6 |
| Length | 7 | 7 |
| Wall thickness | ⅛ | ⅛ |

The rubber plug 50 is foldable and folded as shown in FIGURE 5 to fit and be held within the outer diameter of the upper portion 55 of container 56. The normal shape of plug 50 is with its top 52 hemispherical and its skirt or side 54 cylindrical and smooth on its exterior surface. It is to such shape that plug 50 resiliently returns when it unfolds.

In operation the plug 50 is folded within chamber 51 of container 56 with its lower opening 58 adjacent to but not sealed against the bottom of cavity or chamber 51 and its top end 52 extending upwards. The valve 40 is opened and some gas and water discharged for a few minutes to develop the column 42. Valves 40 and 32 are then closed. The seal 36 is removed; the loaded container 56 is placed in the vertical space within the T 39. The seal 36 is then closed. The gate valve 32 is then opened and the container 56 and the plug 50 therein fall downward through the tube 26. As the container 56 is pointed towards its bottom 57 and as the container 56 has a susbtantially smaller external diameter than the internal diameter of the well bore 26 through which the container 56 passes, the container 56 with plug 50 therein rapidly falls through tubing 26 before water of layer 42 returns into formation 24 and is centered in the tubing 26 during its fall therethrough and does not tumble or break prior during such travel therein. The well is kept closed in for about 10 minutes. Gas from the formation then enters into and raises the pressure within tubing 26 to the formation pressure while the container 56 falls to and through the liquid 27 then in the bottom of the tubing. During the passage of container 56 through the tubing 26, the gas in the tubing 26 enters the folds of the plug 50 between the walls of the cylindrical cavity 51, whereby the gas pressure inside the plug 50 is the same as that on the outside thereof when the tubing 26 is in its closed condition.

Figure 3:
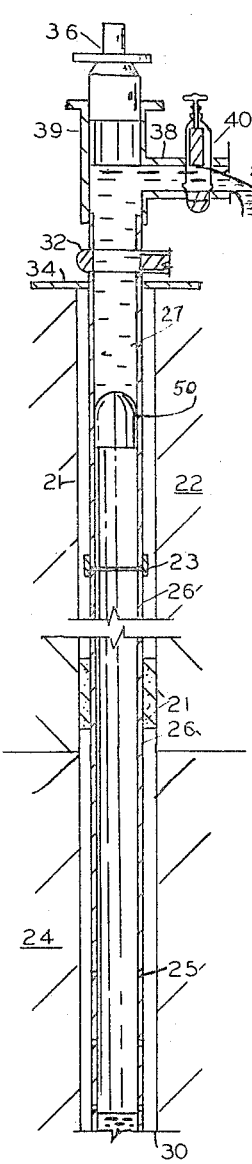
Figure 4:
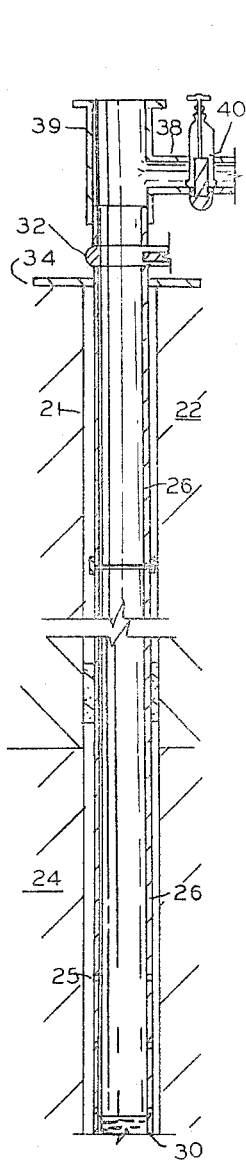
Figure 10:
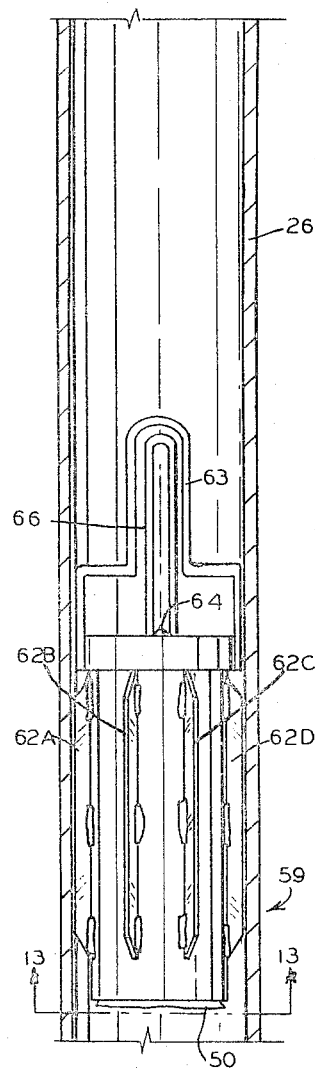
FIGURE 10 is an enlarged side view of the apparatus shown in zone 10 of FIGURE 8.

The container 56, in the preferred embodiment has a specific gravity which is substantially greater than water (approximately 2.1 for solid salt) and the plug 50 being made of rubber, which has a density substantially the same as water, when apparatus 56 meets the water in well (generally at the level at which the gas comes into the well) the container and plug continue downward and sink to the bottom of the well. The container then begins to dissolve in the water, and being frangible in a semidissolved state, is destroyed. The container 56 is made of solid salt so that, while stable during prolonged shelf life and its passage down tubing 26 it readily, reliably, and rapidly dissolves even in brines of gas wells and the dissolution thereof in the well water does not introduce into the well water any material not theretofore present, and therefore does not contaminate the such liquid. Ten minutes after the container 56 has reached the water level, which event may be clearly heard when valve 32 is open, the container 56 is no longer an effective restraint on the expansion of the plug 50 from its narrow folded state to its expanded state wherein it forms a water-tight yet movable seal with the interior wall of tubing 26. The dissolution of the container 56 thus releases plug 50 from its narrowed folded condition so that skirt 54 contacts the tubing 26. Valve 40 and the gate valve 32 are opened. This causes the pressure in the interior of the tubing 26 to drop. The pressure of gas entrapped within the dome formed by the top of 52 of plug 50 at closed well pressures causes the skirt or sides 54 of the plug 50 to be pressed sufficiently tightly against the interior wall of the casing 26 to form a water-tight seal therewith. The plug is forced upward by the pressure of the gas and air in the released plug 50 which, at this stage, is shaped like an inverted U. The plug 50 moves upward at this stage of operation toward the top of the water level of the liquid 27 from the bottom of the well forcing the water thereabove upwards while the plug is moved upwards to and past the level of perforations 25 in tubing 26 through which the gas from the formation enters the tubing 26. The gas engages the skirt of the seal and maintains a resilient sealing contact thereof with the tubing 26 during the passage of plug 50 upwards of the tubing 26 during which passage plug 50 forces the water in the tubing above the container 56 upward, as the plug moves upward. As shown in FIGURE 3, the water 27 is carried upward and out the discharge line 38. As shown in FIGURE 4 opening the top seal 36 results in complete discharge of the plug 50 by well gas after layer 42 of water has been discharged.

The skirt 54 is sufficiently long to form a water-tight seal with the tubing 26 yet not so long as to bind. Also the outside diameter of the skirt is the same as the internal diameter of the tubing whereby the pressure of the gas across the plug provides sufficient pressure to provide sufficient expansion to form an adequately water-tight seal yet not enough expansion to bind the plug 50 in the tubing due to such pressure. The plug 50 is also adequately deformable to accommodate irregularities in the tubing bore due to usual irregularities in manufacture and handling and paraffin and salt deposits in the tubing without loss of a water-tight seal. The resiliency of the skirt is clearly shown by that the operator with his ear near or adjacent to the surface tubing 39 may hear a "flipping" sound as the skirt 54 meets and passes each collar joint as 23 between lengths of tubing during the upward travel of such plug.

In a particular example of the operation of this process, a 2,500 ft. deep gas well, in Gray County Texas Section 106 Block B2 H & GN Survey and was producing water. Approximately 100 gallons of water was removed from it by the process and apparatus above described. The output of the well was then increased 50% such increase in production measured 72 hours after removing liquid.

When there is an open hole gas pay zone, i.e. a zone that is not provided with casing, the plug 50 will rise to the level of the top of the water due to the buoyancy created by the air trapped in the plug 50. On the plug's reaching the level of the tubing where the skirt engages the wall of the tubing the plug will again rise through the tubing, forcing the water thereabove with it. In such instance the plug carries only that water above it which had been held against the wall of the tubing.

Unloading saline waters from gas wells may also be accomplished by the process and particular plug carrier and ejector tool 59 shown in FIGURES 7–13 and plug 50 above described.

Tool 59 comprises a cylindrical casing subassembly 60 and an ejector piston subassembly 65. Subassembly 60 comprises a rigid cylindrical, open ended tube 61, fins 62A, 62B, 62C, 62D, 62E, and 62F, a bail of handle 63 and an ejector retaining bar means 64.

The fins are light yet rigid steel (1/16" thick) and are firmly attached to the tube 61 and project radially therefrom. The U-shaped handle 63 is firmly attached to the top of tube 61 and formed of sturdy steel rod (1/8" diameter). The ejector retaining bar extends diametrically across the top of the tube 61 and is firmly attached at its ends to the top of that tube. Tube 61 has a smooth internal surface.

The ejector subassembly 65 comprises an ejector plate, handle 66 and a piston ejector plate 67. The flat circular plate 67 fits loosely inside of the tube 61. Handle 66 is shaped like an inverted U and its ends are firmly joined to the plate 67. The upper end of handle 66 loops over the retainer rod 64.

In operation the plug 50 is folded and inserted into tube 61 from the tube's bottom and pushed upward until the top of plate 67 meets the bottom of rod 64. Friction from the folded plug and the elasticity of the plug 50 holds the plug 50 in place in tube 61 and also holds the ejector piston in place while the assembly 59 is moved downward and placed in position in the well as below described in relation to FIGURES 7 through 9. The combination of folded plug 50 and apparatus 59 is below referred to as the loaded apparatus 59. Then valves 32 and 40 are left open while seal 36 is kept closed for about 10 minutes. This results in a discharge of formation gas and saline formation liquid into tubing 26; some saline water passes downwardly of perforations 25. The upward movement of the gas and water forms an elongated annular ring, 42, of water above the level of discharge of the gas at perforations 25. This is the same situation as precedes the addition of apparatus 56 and 50 in operation shown in FIGURES 1–5.

The seal 36 is then opened after the valves 32 and 40 have been shut. Thereupon the loaded apparatus 59 is located within the vertical space in T 39 and a wire line 69 is passed through the wire line seal 36 and attached to the handle 63. The seal 32 is then sealed to the top of T 39. Then, with valve 40 still closed valve 32 is opened and loaded apparatus 59 is rapidly lowered down the tubing 26 supported on the wire line 69.

The outer edges of the fins 62A–62E are smooth and fit loosely in the tubing 26 (i.e. spacing of 1/16 to 1/8 inch on each side) and do not interfere with the downward passage of tube 61 through tubing 26. The contents of tube 61 are kept clean by such spacing of tube 61 and tubing string 26 interior as the steel ribs 62A–62F serve to keep well wall debris from interfering with the plug movement and location. The steel ribs also to keep the apparatus 59 centered in tubing 26 and aligned therewtih; the gas in the tubing 26 enters the folds of the plug 50 at the closed in well pressure. The loaded tool 59 is quickly and reliably moved to below the level of perforations 25 in the tubing 26 and below the top level of water 27 in that tubing as in FIGURE 8.

Figure 11:
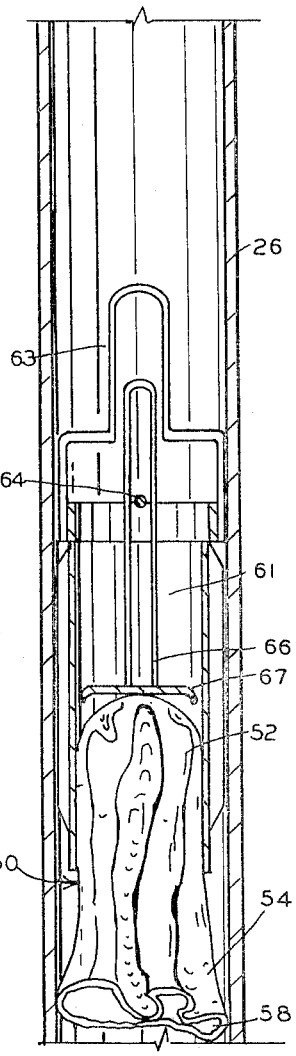
FIGURE 11 is a longitudinal view, shown partly broken away and in section, of the apparatus shown in FIGURE 10 in a stage of its operation subsequent to that shown in FIGURE 8.
Figure 12:
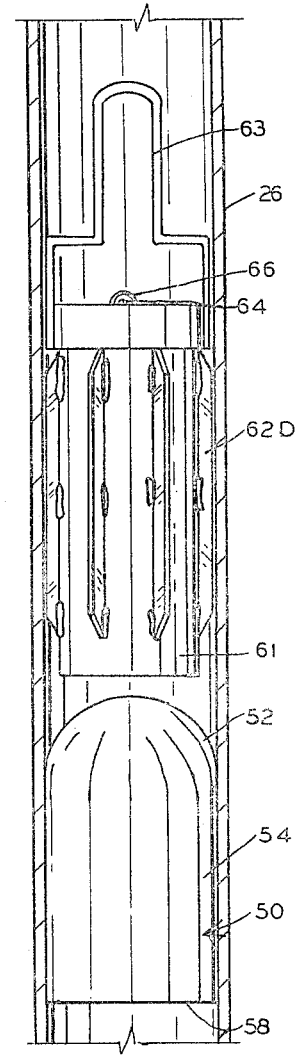
FIGURE 12 is a diagrammatic side view of the apparatus shown in FIGURE 11 in a stage of its operation subsequent to that shown in FIGURE 11 and prior to that shown in FIGURE 9.
Figure 13:
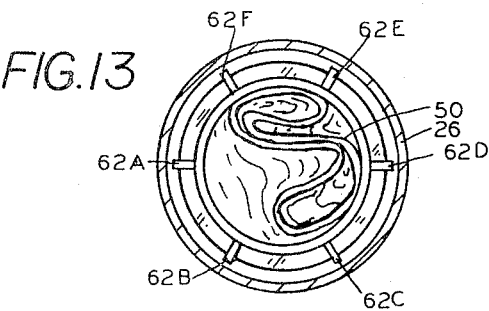
FIGURE 13 is a cross-sectional view taken in plane indicated by the line 13—13 of FIGURE 10.

The weight of the apparatus 59 and plug 50 provide that the loaded apparatus will sink to the bottom of the water column as 27 in the bottom of tubing 26 resulting from the fall of liquid in layer 42 to the bottom of tubing 26; at this point in the operation, illustrated in FIGURE 8, the loaded apparatus 59 is connected to the wire line 69 with the valve 32 open and the valve 40 closed prior to separation of the tool 59 and plug 50 and prior to any major or substantial amount of water of layer 42 returning into formation 24. Below the water level of column 27 in the bottom of tube 26, a water column is developed on the upper surface of the plate 67. A sharp upward movement of the wire line 69, which is firmly attached to the handle 63, moves the tube 61 upward relative to the plate 67 and the plug 50 and releases the plug 50 into the tube 26 generally as shown in FIGURES 11 and 12 at the bottom of tubing string 26 and at the bottom of any water column therein. The tube 61 is then carried upwards. The handle 66 is held by the bar 64 whereby the plate 67 is carried upward with the tube 61. Tube 61 is moved upwards to a point above the level of the top of pipe 38, as in FIGURE 9. Also, valve 32 may then be closed and seal 36 removed with tool 59 and seal 36 then replaced and valve 32 again opened.

The water in layer 42 falls to the bottom of the tubing 26 on closure of valve 40 but the location of plug 50 in its inverted U-shape and removal of tube 61 therefrom precedes escape of most of the water of layer 42 from tubing string 26 into the formation 24 and leaves the gas below plug 50 at the closed in well pressure and the bulk of the saline water of layer 42 above plug 50 within 5 minutes of the closure of valve 40. Valve 40 (as well as 32) is then opened. This causes a drop of pressure within tubing string 26. The release of the pressure in the interior of the tubing 26 and the pressure of the gas entrapped at closed in pressure within the dome formed by the top 52 of the plug 50 causes the smooth and elastic skirt 54 of plug 50 to form a seal that is water tight yet movable along tubing 26 (as above described). The plug 50 moves upward of tubing 26 from the bottom thereof forcing the water thereabove upwards to and past the perforations 25. Thereafter the formation gas also continues to support the upward passage of plug 50 and the water thereabove to and out of discharge pipe 38 and valve 40. During this upward passage the relations of pressure and sealing of skirt 54 of plug 50 are the same as above described for the operation of plug 50 in the process described in relation to FIGURES 1–6.

According to this invention casing leaks may also be tested for. The procedure therefore is to add with valve 40 closed, the loaded apparatus 59 to the tubing 26 to a point above perforation 25 and below that at which the casing leak is suspected to occur. Valve 40 is kept closed; plug 50 is separated from container 59. Container 59 is raised to above valve 32. Then the plug 50 is moved upward by the pressure of the gas coming from the formation 24 until the plug is forced as high as the leak in the casing. Thereafter the gas from the formation passes out through the leak in the casing such as shown as item 75 in FIGURE 9. The plug remains with its bottom at substantially the level of the leak. Thereafter the apparatus 59 is lowered by the wire line with valve 40 closed until contact is made with the top of the plug; the depth of the plug is readily measured by the conventional wire line depth indicator 79 to which wire line 69 is attached and thus one, by this apparatus, determines the level of the casing leak.

The plug 50 has sufficient resiliency to frictionally engage the wall of tubing 26 and so maintain its position after valve 40 is closed for the period during which its location is determined.

Examples of the use of the apparatus and process of the above disclosure are as follows:

|  | Common title | | |
| --- | --- | --- | --- |
|  | Fields A #1 | VIDA #1 | BIV B #1 |
| Location: | | | |
| State | Texas | Texas | Texas. |
| County | Gray | Gray | Sherman. |
| Survey | H & G.N. | H & G.N. | G.H. & H. |
| Block | B-2 | B-2 | 2. |
| Section | 165 | 196 | 16. |
| Tubing size, I.D | 5 in | 5 in | 5 in. |
| Production increase* | 23% | 40% | 45%. |
| Embodiment used (Figs.) | 10-12 | 10-12 | 1-6. |

*Measured 77 hours after removing liquid from plug.

The container 56 may be formed of other stable solid materials that are readily soluble in water and have the strength to contain a plug as 50 such as Polyox® (trademark of Union Carbide) polyethylene oxide polymers or Cellosize® (trademark of Union Carbide) hydroxyethyl cellulose polymer.

In the above descriptions of the apparatus of FIGURES 1-6 and 8-13 it will be noted that the total weight of the plug 50 and its container, either 65 or 59, is sufficient to cause the combination of folded plug and container to sink to the bottom of the column of liquid at the bottom of the tubing or casing string 26 and to sink there quickly enough to achieve its expanded state and rise prior to any susbtantial or major portion of the water previously in column or layer 42 returns to the formation 24.

Dimensions of a particular embodiment of apparatus 59 are as follows:

Tube 61:
    Length _____ in.___ 8
    I.D. _____ in.___ 3¼
    O.D. _____ in.___ 3½
    Thickness _____ in.___ ⅛

Fins 62A–62E:
    Length _____ in.___ 6½
    Thickness _____ in.___ ⅛
    Thickness _____ in.___ ⅛

Plate 167:
    Diameter _____ in.___ 3¼
    Thickness _____ in.___ ½

Figure 15:
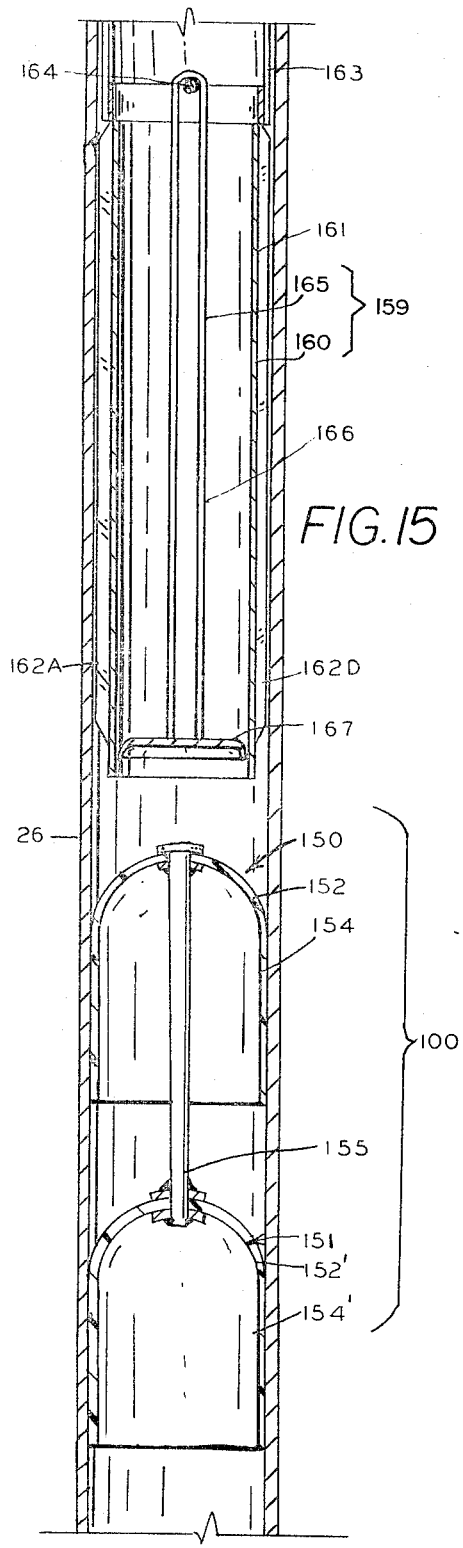
Figure 14:
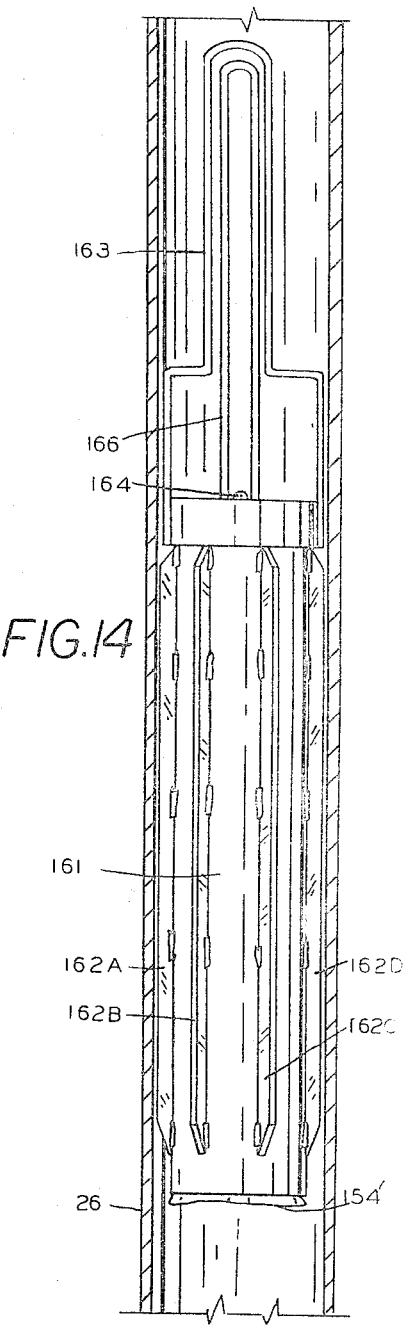
FIGURE 14 is a diagrammatic representation of a longitudinal section of a well bore illustrating in side view another apparatus of this invention during one stage in the operation thereof; and, FIGURE 15 is a longitudinal sectional view of the apparatus of FIGURE 14 showing a subsequent stage of the operation of the apparatus of FIGURE 14.

Handle 66—length _____ in.___ 7
Handle 63—length _____ in.___ 6½
Material _____ Steel Another embodiment of apparatus according to this invention is shown in FIGURES 14 and 15. Here the loaded apparatus comprises the double plug carrier and injector tool 159 and the double plug subassembly 100.

The subassembly 100 comprises two similar plugs, 150 and 151 each secured by a gas-tight connection at its top and center to a rigid spacing staff 155. (1″ O.D. hollow steel shaft 18″ long in the preferred embodiment.)

Tool 159 comprises a cylindrical casing subassembly 160 and an ejector piston subassembly 165. Subassembly 160 comprises a rigid cylindrical, open ended tube 161, fins similar to 62A to 62F as 162A, 162B, 162C, and 162D, a bail or handle 163 and an ejector retaining bar means 164.

The fins are light yet rigid steel (1/16″ thick) and are firmly attached to the tube 161 and project radially therefrom ½″. The U-shaped handle 163 is firmly attached to the top of tube 161 and formed of sturdy steel rod (⅛″ diameter). The ejector retaining bar extends diametrically across the top of the tube 161 and is firmly attached at its ends to the top of that tube. Tube 161 has a smooth internal surface.

The ejector subsassembly 165 comprises an ejector plate, handle 166 and a piston ejector plate 167. The flat circular plate 167 fits loosely inside of the tube 161. Handle 166 is shaped like an inverted U and its ends are firmly joined to the plate 167. The upper end of handle 166 loops over the retainer rod 164 and holds it, when extended, as shown in FIGURE 15, slightly above the bottom of tube 161.

In operation the plugs 150 and 151 are folded longitudinally (as in plug 50 in tube 61 or in shell 55) and inserted into tube 161 from the tube's bottom and pushed upward and push on plate 167 until the top of plate 167 meets the bottom of rod 164. Friction from the folded plugs and the elasticity of the plugs 150 and 151 holds the plugs in place in tube 161 and also holds the ejector piston 165 in place while the assembly 159 is moved downward and placed in position in the well as above described in relation to FIGURES 7 through 9. The combination of folded plug subassembly 100 and apparatus 159 is below referred to as the loaded apparatus 159. Then valves 32 and 40 are left open while seal 36 is kept closed for about 10 minutes. This results in a discharge of formation gas and saline formation liquid into tubing 26; some saline water passes downwardly of perforations 25. The upward movement of the gas and water forms an elongated annular ring, 42, of water above the level of discharge of the gas at perforations 25.

The seal 36 is then opened after the valves 32 and 40 have been shut. Thereupon the loaded apparatus 159 is located within the vertical space in T 39 and a wire line 69 is passed through the wire line seal 36 and attached to the handle 163. The seal 32 is then sealed to the top of T 39. Then, with valve 40 still closed valve 32 is opened, and loaded apparatus 159 is rapidly lowered down the tubing 26 supported on the wire line 69.

The outer edges of the fins as 162A–D are smooth and fit loosely in the bore of the tubing string 26 (i.e. spacing of 1/16 to ⅛ inch on each side) and do not interfere with the downward passage of tube 61 through tubing 26. The contents of tube 161 are kept clean by such spacing of tube 161 and tubing string 26 interior as the steel fins as 162A–162D serve to keep well wall debris from interfering with the plug movement and location. The steel fins also keep the apparatus 159 centered in the bore of the tubing string 26 and aligned therewith; the gas in the tubing 26 enters the folds of the plugs 150 and 151 at the closed in well pressure. The loaded tool 159 is quickly and reliably moved to below the level of perforations 25 in the tubing string 26 and below the top level of water 27 in the bore of that tubing string as for loaded tool 159 in FIGURE 8.

The weight of the apparatus 159 and double plug subassembly 100 provide that the loaded apparatus 159 will sink to the bottom of the water column as 27 in the bottom of tubing string resulting from the fall of liquid in layer 42 to the bottom of the bore of tubing string 26; at this point in the operation, as illustrated for the loaded tool 59 in FIGURE 8, the loaded apparatus 159 is connected to the wire line 69 with the valve 32 open and the valve 40 closed prior to separation of the tool 159 and double plug subassembly 100 and prior to any major or substantial amount of water of layer 42 returning into formation 24. Below the water level of column 27 in the bottom of the bore of tubing string 26, a water column is developed on the upper surface of the plate 167. A sharp upward movement of the wire line 69, which is firmly attached to the handle 163, moves the tube 161 upward relative to the plate 167 and the double plug subassembly 100 and releases the double plug subassembly 100 into the bore of the string 26 generally as shown in FIGURE 15 at the bottom of tubing string 26 and at the bottom of any water column therein. The tube 161 is then carried upwards. The handle 166 is held by the bar 164 whereby the plate 167 is carried upward with the tube 161. Tube 161 is moved upwards to a point above the level of the top of pipe 38.

The water in layer 42 falls to the bottom of the tubing 26 on closure of valve 40 but the location of plugs 150 and 151 in their inverted U-shape and removal of tube 161 therefrom precedes escape of most of the water of layer 42 from tubing string 26 into the formation 24 and leaves the gas entrapped below plugs 150 and 151 at the closed in well pressure and the bulk of the saline water of layer 42 above those plugs within 5 minutes of the closure of valve 40. Valve 40 (as well as 32) is then opened. This causes a drop of pressure within tubing string 26.

The release of the pressure in the interior of the tubing 26 and the pressure of the gas entrapped at closed in pressure within the dome formed by the top 152 of the plug 150 and 152′ of plug 151 causes the smooth and elastic skirt 154 of plug 150 and 154′ of plug 151 to form seals that are water tight yet movable along tubing 26. The double plug subassembly 100 then moves upward of tubing 26 from the bottom thereof forcing the water thereabove upwards to and past the perforations 25. Thereafter the formation gas also continues to support the upward passage of subassembly 100 and the water thereabove to and out of discharge pipe 38 and valve 40. During this upward passage the relations of pressure and sealing of skirt 154 of plug 150 and 154′ of plug 151 are the same as above described for the operation of plug 50 in the process described in relation to FIGURES 1–6.

The double plug assembly 100 may also be used in a soluble container as 56 with the hollow cylindrical sleeve portion 55 therefor modified to be adequately long to encompass both plugs 150 and 151 and the staff therebetween.

In the embodiment of FIGURES 14 and 15 the plugs 150 and 151 are each the same size as the plug 50 (used in the embodiment shown in FIGURES 1–13). The tubing 161 and handles 163 and 166 are sufficiently long to provide for substantially complete housing of the plugs 150 and 151 on their downward travel through a well tubing or casing string as 26. It is however within the scope of this invention that plugs 150 and 151 each may be somewhat shorter than is plug 50, the bottom end thereof being only 2 inches below the crown, the crown being the line along which hemispherical portion 52 and cylindrical portion 54 in the embodiment 50 join. This makes the plugs somewhat more flexible and avoid jamming on heavy paraffin accumulations and similar substantial constrictions found in gas well tubes. This design is particularly practical for well bores that are particularly irregular.

It is also within the scope of the invention that the folded plug as 50 or 150 may be dropped down the bore of a string as 26 when the valve 32 is open and seal 36 removed. In such operation the well is allowed to blow a short time (e.g. 10 minutes) until the pressure falls to such a value as to allow the folded plug in its container to fall down string 26. The flow of gas not only removes from the formation all water which had covered the interstices of the gas formation neighboring to perforations 25 in tubing string 26 but also produces an annular water column as 42. The first solid column of water that the loaded container 56 or 59 meets is right below the level from which the gas from the formation enters into the string 26. The plug 50 is released from its carrier 56 or 59 as above described and comes to the top of the level of liquid then in the bottom of the bore of tubing string 26 and is moved by the flow of gas from the formation up the tubing string 26 and completely removes all of the water in the annular column 42 theretofore above it.

Although, in accordance with the provision of the present statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A process of treating a gas producing well which well also produces liquid water, said well comprising a formation producing gas and water, a tubing string passing from the well surface to said formation, perforations in said tubing providing communication between said formation and the bore of said tubing string, and a discharge valve at the top portion of said tubing string and operatively connected thereto, which process comprises the steps of
    (a) blowing the well by opening said discharge valve, and creating an annular column of liquid water in the tubing string bore,
    (b) closing the well in by closing said discharge valve and transferring the water in said annular column of liquid water to the bottom of the tubing string bore,
    (c) passing down the well a collapsible plug within a container of smaller external diameter than the internal diameter of said tubing and entrapping gas at closed in formation pressure in said plug and passing said container and plug to the bottom of said column prior to the major portion of said water returning to said formation,
    (d) separating said plug from its container,
    (e) expanding the plug to a resilient and sliding fit with the internal surface of said well bore,
    (f) opening said well discharge valve and reducing the pressure in said tubing string bore,
    (g) expanding the gas within said plug and moving said plug and the water thereabove upward of said tubing and
    (h) passing said liquid water out of said tubing.

2. Process as in claim 1 wherein the container is separated from its plug by dissolving the container in the liquid water at the bottom of the tubing string bore.

3. Process as in claim 1 wherein the container is removed from the bottom of the well to a level higher than said discharge valve prior to opening said well discharge.

4. Process as in claim 1 wherein the plug is removed from the well after said water is removed from said well.

5. A process of treating a gas producing well which well also produces liquid water, said well comprising a formation producing gas and water, a tubing string passing from the well surface to said formation, perforations in said tubing providing communication between said formation and the bore of said tubing string, and a discharge valve at the top portion of said tubing string and operatively connected thereto, which process comprises the steps of
    (a) blowing the well by opening said discharge valve, and creating a column of liquid water in the tubing string bore, (b) passing down the well a collapsible plug within a container of smaller external diameter than the internal diameter of said tubing and passing said container and plug to the bottom of said formation column prior to the major portion of said water returning to said formation,
(c) separating said plug from its container,
(d) expanding the plug to a resilient and sliding fit with the internal surface of said well bore, and
(d) moving said plug and the water thereabove upward of said tubing, and
(f) passing said liquid water out of said tubing.

6. Process as in claim 5 wherein the container is separated from its plug by dissolving the container in the liquid water at the bottom of the tubing string bore.

No references cited.

ROBERT M. WALKER, *Primary Examiner.*